Oct. 29, 1963   C. E. ANDERSON   3,108,779
VALVE HAVING A VALVE SEAT OF VERY THIN MATERIAL
Filed Nov. 12, 1959   6 Sheets-Sheet 1
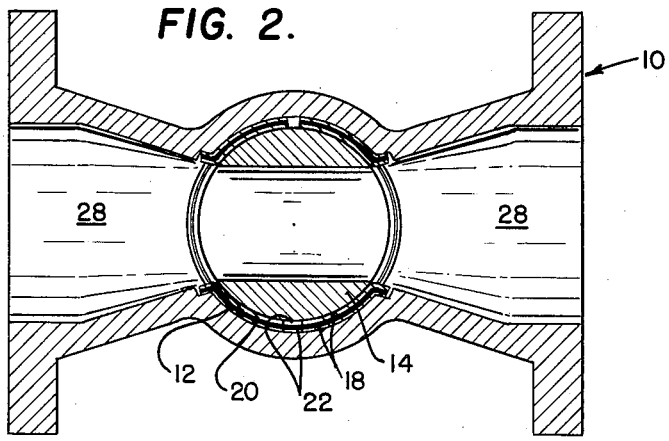
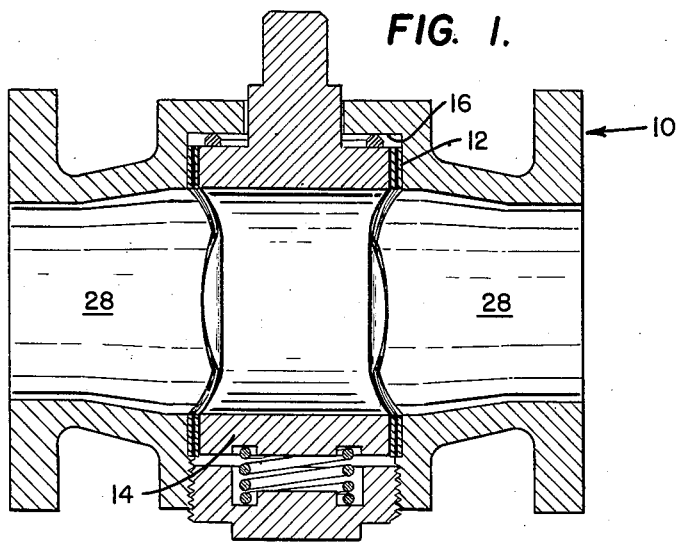
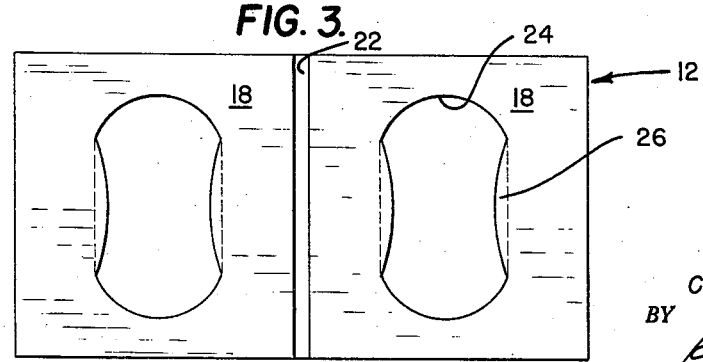
INVENTOR.
CLIFFORD E. ANDERSON
BY
*Russell E. Dehloff*
ATTORNEY Oct. 29, 1963 C. E. ANDERSON 3,108,779
VALVE HAVING A VALVE SEAT OF VERY THIN MATERIAL
Filed Nov. 12, 1959 6 Sheets-Sheet 2

INVENTOR.
CLIFFORD E. ANDERSON
BY
*Russell E. Schloff*
ATTORNEY

Oct. 29, 1963    C. E. ANDERSON    3,108,779
VALVE HAVING A VALVE SEAT OF VERY THIN MATERIAL
Filed Nov. 12, 1959    6 Sheets-Sheet 4
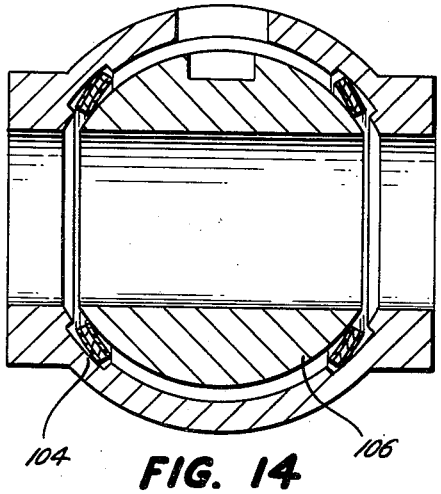
FIG. 14
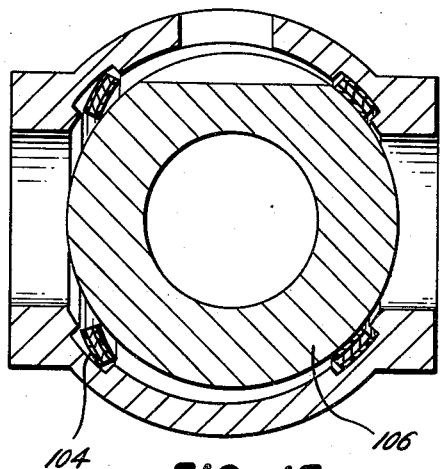
FIG. 15
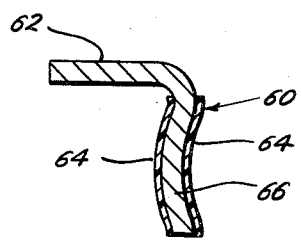
FIG. 7
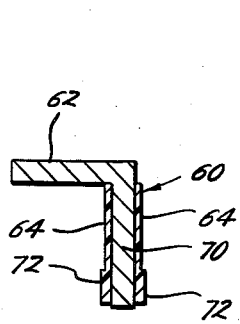
FIG. 9
FIG. 8
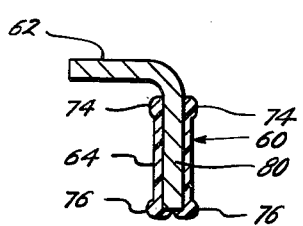
FIG. 10
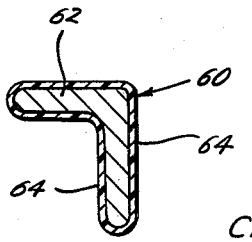
FIG. 11
INVENTOR.
CLIFFORD E. ANDERSON
BY
Russell E. Schloff
ATTORNEY Oct. 29, 1963 C. E. ANDERSON 3,108,779
VALVE HAVING A VALVE SEAT OF VERY THIN MATERIAL
Filed Nov. 12, 1959 6 Sheets-Sheet 5

INVENTOR.
CLIFFORD E. ANDERSON
BY
Russell E. Schloff
ATTORNEY

Oct. 29, 1963 C. E. ANDERSON 3,108,779
VALVE HAVING A VALVE SEAT OF VERY THIN MATERIAL
Filed Nov. 12, 1959 6 Sheets-Sheet 6
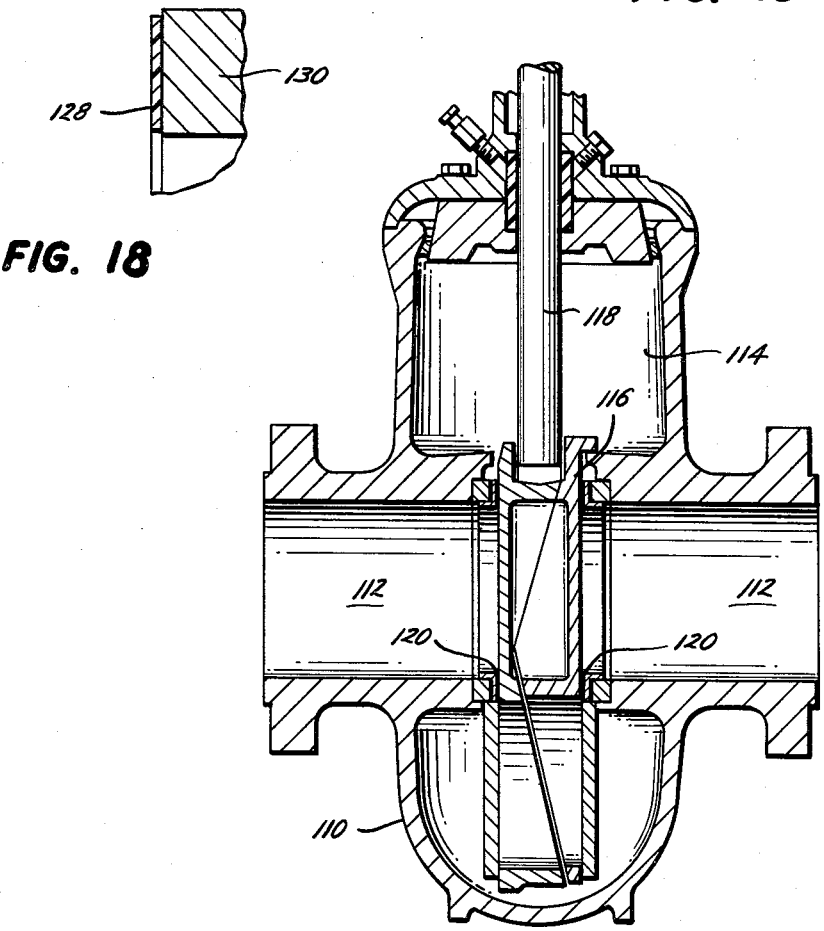
FIG. 16
FIG. 18
FIG. 17
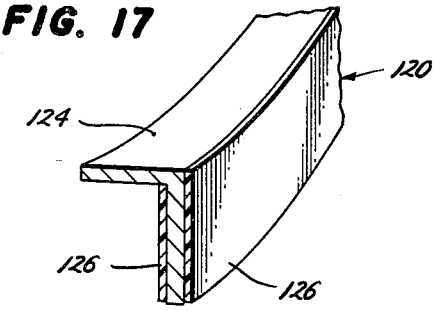
INVENTOR.
CLIFFORD E. ANDERSON
BY
Russell E. Schloff
ATTORNEY 3,108,779
VALVE HAVING A VALVE SEAT OF VERY
THIN MATERIAL
Clifford E. Anderson, Houston, Tex., assignor to ACF
Industries Incorporated, New York, N.Y., a corporation of New Jersey
Filed Nov. 12, 1959, Ser. No. 852,577
1 Claim. (Cl. 251—309)

This invention relates generally to valves and more particularly to a sealing means assembly therefor. This application is a continuation in part of my co-pending application, S.N. 633,164, filed January 8, 1957, now abandoned.

Valves, regardless of types, have among others, two important requisites: (1) establishment of a good seal and (2) ease of operation.

To obtain a good seal and thereby prevent leakage, several methods have been used. One method has been to have a metal-to-metal seal which is obtained by providing a precision finish on both the valve member and the seat. To provide the necessary finish, high quality machining and rigid tolerances are required. In high pressure valves having a metal-to-metal seal, a very rigid valve structure is required inasmuch as any extension of the body under the application of line pressure would destroy the seal. Naturally, in order to attain these requirements, the cost of manufacturing increases. Another method to obtain a good seal has been to use a sealant between the valve member and the seat to provide sealing. The sealant is forced between the valve member and the seat and into any surface irregularities to provide sealing characteristics approaching that of a metal-to-metal seal. Even though the initial manufacturing cost may be less, such valves require the continued maintenance of the sealant film in order to maintain tightness. Another method has been to utilize a resilient member as a seal, the resilient member being able to yield somewhat in order to bring the sealing characteristics up to a condition approaching the sealing properties of super finished metal-to-metal seating surfaces. However, as a rule, resilient materials do not have good load carrying characteristics, and therefore, valves with resilient seals have been limited to use in the low pressure range. Moreover, as a rule, resilient materials are not resistant to corrosive action and also are essentially usable only in atmospheric ambient temperature service.

As the pressure of the lading in the valve is increased, ease of operation is more difficult to control. In plug type valves particularly, the torque required to operate the valve becomes exceedingly high. In order to reduce the friction between the valve member and the seat, manufacturers have been constantly searching for materials having low coefficients of friction. Many valves, both plug and gate type, require the use of a lubricant in order to increase the ease of operation as well as assist in sealing.

The development of fluorocarbon resins resulted in the availability of materials having low coefficients of friction, and materials, which, unlike most resilient materials, resist most corrosive ladings and can be operated at fairly elevated temperatures. One of the commercially available fluorocarbon resins is polytetrafluoroethylene which has a low coefficient of friction, .04 against steel; is inert to all known chemicals except molten alkali metals, fluorine at elevated temperatures and certain complex halogen compounds; and can be used for continuous service at temperatures as high as 500° F. Polytetrafluoroethylene is commercially sold in the United States by E. I. du Pont de Nemours & Company under its registered trademark "Teflon." However, polytetrafluoroethylene, like the other fluorocarbon resins, has one undesirable characteristic for use in high pressure valves in that, as described in United States Patent No. 2,735,645, polytetrafluoroethylene will cold flow noticeably starting at a pressure of approximately 600 p.s.i. will have a sustained deformation of from 4 to 8% at a pressure of 1200 p.s.i. and such percentages will increase up to substantially continuous flow at pressures at about 1500 p.s.i. The above described deformation is considerably aggravated at elevated temperatures. Therefore, although polytetrafluoroethylene has the desirable characteristics of low coefficient of friction and resistance to corrosive action of most ladings, it was not considered suitable for utilization as a valve seat in valves where the loading on the seat is in excess of 1200 p.s.i. Moreover, in common with other fluorocarbon materials, polytetrafluoroethylene has a relatively high coefficient of thermal expansion which can cause binding and tightening of moving parts when used in conjunction with metal components at elevated temperatures; and a subsequent loss of contact resulting in leakage when the temperature is substantially lowered. Another fluorocarbon resin having many desirable characteristics for valve seats, but having the same undesirable characteristics of inability to withstand high load is polytrifluorochloroethylene which is commercially available in the United States from M. W. Kellogg Company under its registered trademark "Kel-F".

In the present invention, it has been found that by utilizing a very thin layer of fluorocarbon material, between .005 to .050 of an inch in thickness, and bonding it to a load carrying structure, that the fluorocarbon material will withstand high pressure even at elevated temperatures and will retain this increased resistance to cold flowing as long as the bond remains intact. It appears that the shear strength of the bond is sufficient to increase the internal resistance to extrusion forces within the fluorocarbon materials. Simultaneous compression of identical bonded and unbonded specimens has disclosed that while the unbonded specimens would cold flow the bonded specimens had marked resistance to cold flow. Also, a usable very thin layer of fluorocarbon material will have considerably less total expansion or contraction than a thick section and the possibility of binding or loss of contact is minimized.

The very thin bonded fluorocarbon sealing means of the present inventions can be utilized in numerous ways. (1) It can be bonded to the valve member, (2) it can be bonded to the seat, (3) it can be bonded to a load carrying liner, (4) it can be bonded to load carrying material and used as a seat insert, (5) it can be bonded to other load carrying structures and used to effect a seal and/or to permit easier operation of the valve. In all cases, the use of the very thin fluorocarbon sealing means has resulted in a valve having good sealing qualities and ease of operation. Sealing means so formed have been utilized in plug valves subjected to 10,000 p.s.i. pressure and the sealing means did not cold flow. Moreover, it only required approximately 30 foot pounds of torque to operate.

It is an object of the present invention to provide a sealing means assembly formed of a very thin fluorocarbon material bonded to a load carrying structure.

It is another object of the present invention to provide a liner for a high pressure valve by bonding a layer of very thin fluorocarbon material to a load carrying structure.

It is a further object of the present invention to provide a non-corrosive, high pressure, easily operable valve having a resilient sealing means.

It is a further object of the present invention to utilize a sealing means for a valve seat insert formed by bonding a very thin layer of fluorocarbon material to a load carrying structure.

It is a further object of this present invention to provide a valve with excellent sealing characteristics and with ease of operation without the use of lubricants or excessively tight manufacturing tolerances.

It is a further object of the present invention to provide a method of supporting a load by bonding a very thin fluorocarbon material to a load carrying structure wherein the frictional, sealing, and chemical resistive characteristics of the fluorocarbon material may be utilized.

It is a further object of the present invention to provide a method of supporting a load by bonding a layer of very thin fluorocarbon material to a load carrying structure wherein the cold flow and thermal characteristics of the resilient material are minimized.

It is a further object of the present invention to utilize as a sealing means for a high pressure valve the desirable characteristics of fluorocarbon materials while controlling the inherent characteristic of such material to extrude under application of pressure.

Other and further objects of the invention will be obvious upon an understanding of the illustrative embodiments about to be described, or will be indicated in the appended claim, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIGURE 1 is a vertical cross section of a cylindrical plug valve having a resilient liner of the present invention.

FIGURE 2 is a horizontal cross section of the valve shown in FIGURE 1.

FIGURE 3 is a layout of the liner incorporated in the valve shown in FIGURE 1.

FIGURES 7 through 11 are cross sectional views illustrating various ways in which the sealing faces shown in FIGURES 5 and 6 can be formed.

FIGURE 14 is a diagrammatic vertical section of a spherical plug valve utilizing a Belleville spring as a carrier for the resilient seal.

FIGURE 15 is a view similar to FIGURE 14 showing the action of the seal when the valve is in closed position under pressure.

FIGURE 16 is a vertical cross section of a gate valve incorporating a resilient port seal.

FIGURE 17 is a partial perspective view of the seal utilized in the valve shown in FIGURE 16.

FIGURE 18 is a partial section showing resilient material bonded directly to a valve member or seat.

Figure 4:
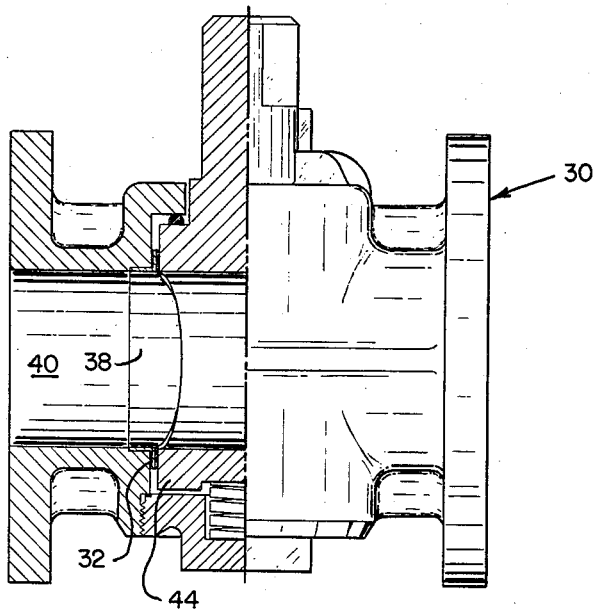
FIGURE 4 is an elevation of cylindrical plug valve, portion being in section, incorporating a resilient seal around the ports.

The present invention relates to the utilization of a layer of very thin fluorocarbon material bonded to a load carrying structure and has various means of application for use in valves. For example, the fluorocarbon material can be bonded directly to the valve member such as the gate or plug; it can be directly bonded to the body surrounding the flow passage; the fluorocarbon material can be bonded to a load carrying structure and the assembly can be utilized as a liner or seat insert; moreover, the fluorocarbon material can be bonded to a load carrying structure and the assembly can be utilized to ease the operation of the valve. In all applications, the principle is the same, i.e., a very thin layer of fluorocarbon material is bonded to a load carrying surface and by being so bonded the normal extrusion characteristics of the fluorocarbon material under pressure are substantially reduced making the assembly applicable for use with pressures greatly in excess of the pressure normally associated with the use of such material.

For example, in a compression test at 2000 p.s.i. compression stress and 250° F., three sets of specimens were simultaneously tested. Each set of specimens consisted of a sample bonded to a metal reinforcement and a sample unbonded. Each sample was loaded between identical bearing blocks, the surfaces of which were extremely smooth with each specimen having the same surface conditions. Each set of samples were of a different set thickness. The individual specimens of each set being of the same initial thickness. The specimens ranged in thickness from .010″ to .020″. After the above load and temperature were applied continuously for over 36 hours, the specimens were examined. All of the unbonded specimens had appreciably extruded tangentially with a corresponding loss of thickness. The bonded samples showed no evidence of extrusion in the areas where the bond remained intact and negligible decrease in thickness. The decrease in thickness of the bonded samples was apparently a result of voids in the specimen itself and in the bonding agent.

In another compressive test with a maximum test pressure of 4000 p.s.i. for a period totalling 72 hours, .010″ and .040″ bonded and unbonded specimens of unfilled virgin polytetrafluoroethylene were tested. It was found that the bonded .010″ specimen only compressed 1.4% at 2000 p.s.i. and 6% at 4000 p.s.i., whereas the unbonded .010″ specimen compressed 29% at 2000 p.s.i. and 45% at 4000 p.s.i. The bonded .040″ specimen compressed 6.7% at 2000 p.s.i. and 15% at 4000 p.s.i. whereas the unbonded .040″ specimen compressed 30% at 2000 p.s.i. and 63% at 4000 p.s.i.

Compression as used in the previous tests naturally means the vertical movement normal to the plane of the restraining member indicating the amount of movement within the material parallel to the plane of the restraining member. Hence, the greater this lateral movement, the greater the compression. The lesser compression of the bonded specimen resulted from the greatly increased restraint of the molecules adjacent the bonded face. In essence, this means the closer that the load is applied to the plane of bonding the higher the apparent shear modulus of the fluorocarbon material. If the layer is sufficiently thin, the shear modulus will appoach that of the bond material itself. As the thickness of the bonded specimen is increased, the effect of the restraint of the boundary layer becomes a smaller factor and the compression, or lateral movement, increases. It was determined from numerous tests that the breaking point of effectiveness is in the neighborhood of .050″.

The thickness to be used will depend upon such factors as the rated pressure of the valve, unit load on the seat, etc. For example, in a 2″ valve tested to 10,000 pounds, a layer of .010″ thickness was used. As the unit load on the seat is decreased, the thickness of the layer may be correspondingly increased. If the fluorocarbon material is provided with filler material which increases its shear modulus, such as glass fiber, the thickness may be increased accordingly up to the forementioned limits. The invention permits the utilization of fluorocarbon materials which have a high degree of inertness, wide temperature range, good resiliency and low coefficient of friction, but a low load carrying capacity as a seat member for high pressure valves or valves with high seat loading. As previously mentioned, the use of a very thin layer also is of benefit against the other drawback, the high coefficient of expansion.

Reference will now be made to the drawings and it should be understood that the drawings are illustrative and are not intended to restrict the invention to any precise design or form. Furthermore, those skilled in the art will appreciate that there may be many variations in application of the bonded very thin resilient material. In fact, it is a purpose of this invention to provide an assembly of very thin layers of fluorocarbon material bonded to a load carrying material of such flexibility that it adapts itself not only for the sealing of a valve, but for many auxiliary load carrying purposes as well. For instance, a layer of very thin polytetrafluoroethylene resin bonded to a load carrying structure has been found to make an excellent thrust washer or bearing. Also, such assembly can be utilized to reduce friction in a plug valve utilizing other sealing means.

Since the application resides in the utilization of the assembly formed of bonded very thin fluorocarbon material, the description of the various embodiments shown in the drawings will be directed mainly to the details of the sealing assembly rather than to the specific structural details of the valve itself, it being understood that the various valves are provided with the necessary elements to permit them to perform the normal valving function, such as, means to attach the valve to a flow system, means to operate the valving member from open to closed position, means properly sealing the valve housing to prevent leaks, etc.

Referring to FIGURES 1 and 2, a cylindrical plug valve 10 is shown incorporating a liner 12 formed in accordance with the present invention. The liner 12 surrounds the plug 14 in the plug chamber 16, which is of sufficient size to accommodate both the plug 14 and the liner 12. The liner 12, which is shown as a layout in FIGURE 3, is comprised of two layers 18—18 of very thin fluorocarbon material bonded to a central load carrying member 20 which may be sheet steel. If desired, each layer 18 of fluorocarbon material may be formed of two pieces with a space 22 therebetween. Such construction relieves the buildup of sheer stress produced during rolling by the increase of either tensile or compressive stress which would be directly proportional to the length of interrupted material, thereby the tendency for the failure of the bond at the ends of the liner is substantially reduced. The liner 12 is provided with openings 24—24 which are so formed as to provide material for tangs 26—26. After the liner has been fabricated in the form shown in the FIGURE 3, it is then formed into a cylinder and inserted into the plug chamber 16. The tangs 26—26 are bent outwardly and aid in orienting the liner in the plug chamber maintaining the openings 24—24 in registry with the flow passage 28—28 of the valve. As shown in FIGURE 2, the ends of the liner do not have to make contact and there may be a slight space between the ends. The valve should be so designed that the plug 14 may, in closed position, move over against the downstream side of the liner upon the application of line pressure thereby permitting the plug to come into intimate contact with the resilient sealing surface. The resilient sealing surface will give somewhat permitting any minor irregularities in the surface of the plug area to be confined by sealing material thereby tightly sealing the valve. As previously discussed, the thickness of the fluorocarbon material is such that after being bonded to the load carrying member the strength is sufficient to withstand substantial pressure, and therefore, will not extrude under the application of line pressure even though such pressure may be greatly in excess of the load carrying capacity of unbonded fluorocarbon material. It was found that a liner using .010" thick layers of polytetrafluoroethylene bonded to a load carrying member of 1/32" steel could be used successfully in a valve subjected to 10,000 pounds pressure.

Figure 5:
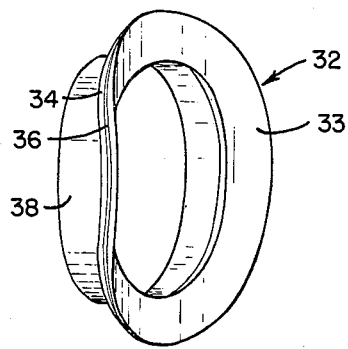
FIGURE 5 is a perspective view of the seal utilized in the valve shown in FIGURE 4.

If desired, a seat insert may be used in place of the full wrap-around liner 12 previously described. FIGURE 4 discloses a cylindrical plug valve 30 incorporating such an insert. The seat insert 32, shown in detail in FIGURE 5, has a sealing portion 33 comprised of layers 34—34 of very thin fluorocarbon material bonded to a central load carrying member 36. The load carrying member 36 is provided with an annular flange 38 which telescopes into the flow passage 40 of the valve to orient the seat insert in proper position. The face of the sealing portion 33 of the insert is shaped to mate with the cylindrical plug 44 of the valve. As previously mentioned in connection with FIGURES 1 and 2, the plug must be provided with sufficient clearance to permit it to float against the downstream insert. While the valve can be used to check flow in either direction, it only seals against the downstream side since it is the downstream side where the valve member is in intimate contact with the resilient surface.

Figure 6:
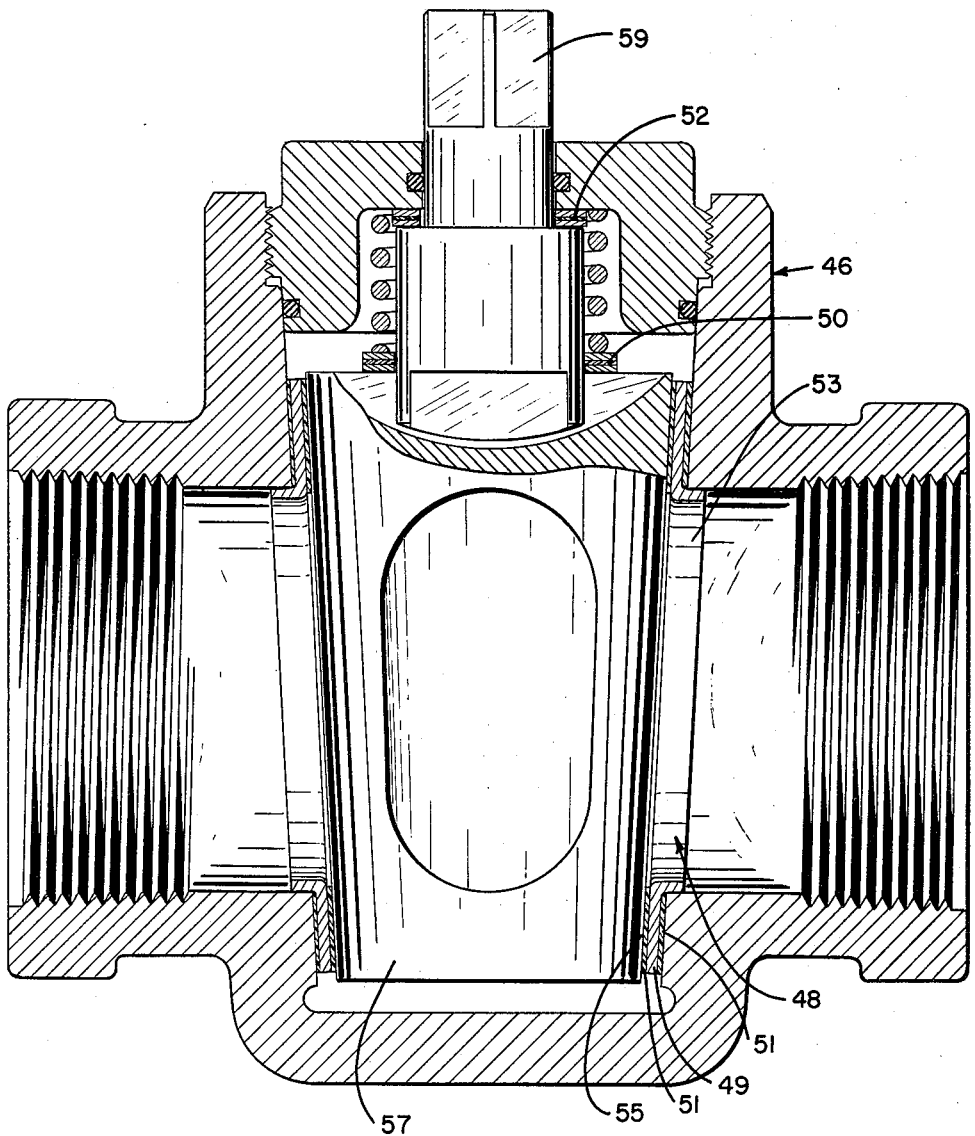
FIGURE 6 is a view similar to FIGURE 1 showing the resilient port seal incorporated in a taper plug valve.

As shown in FIGURE 6, the invention is also applicable to a tapered plug valve 46. While a seat insert 48 is shown, a full wrap-around liner similar to the one shown in connection with the valve in FIGURES 1 and 2 could be likewise utilized. The seat insert 48 is similar to the seat insert 32 previously described. A load carrying structure 49 is sandwiched between two layers 51—51 of very thin fluorocarbon material, with the two layers 51—51 of very thin fluorocarbon material being bonded to the load carrying structure. The load carrying structure is provided with a means to orient and anchor the assembly into position in the valve. Such means may be an annular flange 53 extending from the load carrying structure. The face 55 of the insert 48 is formed to mate with the plug 57. The valve 46 also utilizes two thrust washers 50 and 52 which are formed in accordance with the teaching of the present invention. The washers 50 and 52 are constructed of layers of polytetrafluoroethylene bonded to a load carrying member. By utilizing a very thin layer of such material, it has been found that the material can withstand many times the unbonded load. Inasmuch as polytetrafluoroethylene has a low coefficient of friction, friction is substantially reduced. Valve 46 also utilizes a floating plug, that is, the plug 57 is independent of the stem 59. The end of the stem 59 drives the plug through a keyway connection in the top of the plug as is well known in the art.

FIGURES 7 through 11 show various types of face construction for inserts. In all forms shown there is a load carrying structure 60 having an annular flange 62 adapted to extend into the flow passage to orient the seat insert into position. Other means to orient and anchor the inserts may be utilized. Bonded to each side of the load carrying structure 60 is a layer 64 of very thin fluorocarbon material. In FIGURE 7, the face 66 of the load carrying structure is of serpentine form and the layers 64—64 of fluorocarbon material are bonded to such face structure. By having the sealing face 66 of the load carrying member shaped in serpentine fashion, the valve member will first contact the inner and outer edges of the face 66 and the central section will contact the body. All contacts will be line contacts and due to the natural resiliency of such form will provide sealing force in excess of plain area contact. In FIGURE 8, the face 68 of the load carrying structure is in the form of a Belleville spring. By utilizing such form, contact will be first made at the inner edge of the insert and due to the natural resiliency of the Belleville spring, there will always be a greater sealing load at such point. In FIGURE 9, the face 70 of the insert is flat but the outer edge 72 of the fluorocarbon material is reinforced, therefore there will be a greater loading at such point and consequently a greater unit seal at such point. In FIGURE 10, both the inner edge 74 and outer 76 are reinforced, also the outer edge extends past the edge 80 of the load carrying structure. In such form, there will be a greater unit load at the inner edge 74 and the outer edge 76. Also, inasmuch as the line pressure can act upon the separate outer edges, there will be increased loading due to the force imparted upon the fluorocarbon material by a line pressure. In FIGURE 11, the layers of very thin fluorocarbon material 64—64 extend all the way around the load carrying structure 60 and not only over the face as has been previously the case. Such form is especially applicable for use in valves for flowing extremely corrosive material inasmuch as no part of the load carrying structure will be subjected to the corrosive action of the lading.

Figure 12:
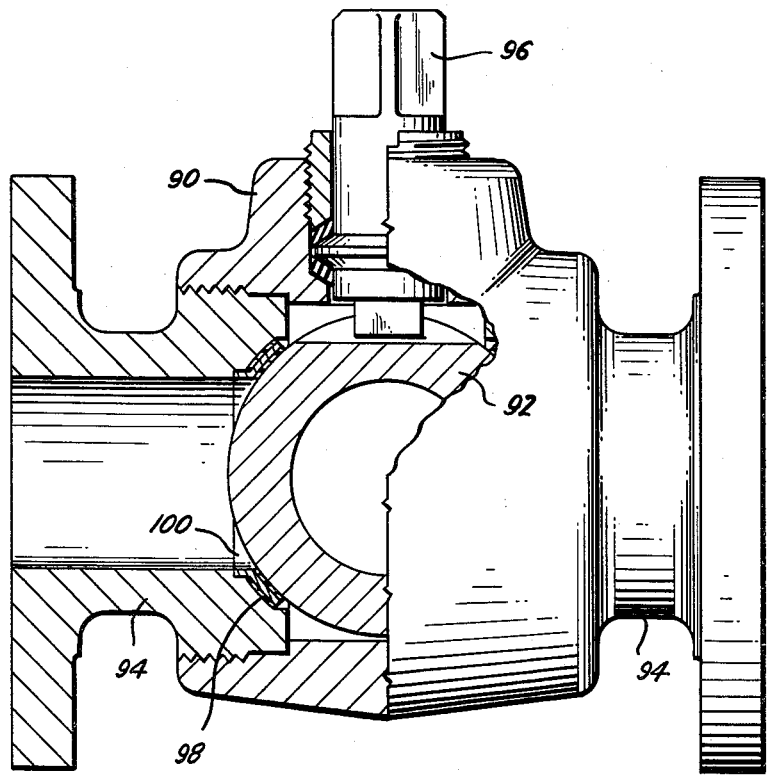
FIGURE 12 is a view similar to FIGURE 4 showing the resilient port seal incorporated in a spherical plug valve.
Figure 13:
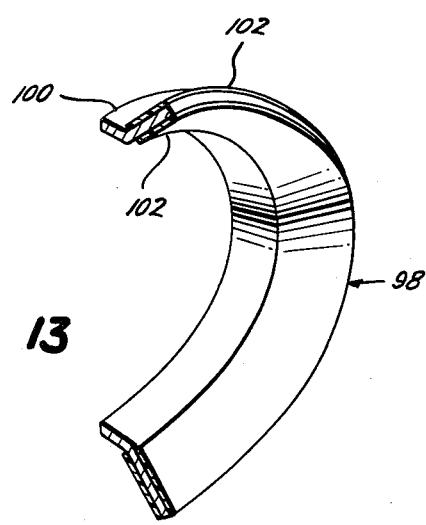
FIGURE 13 is a partial perspective view of the seal utilized in the valve shown in FIGURE 12.

FIGURE 12 shows the invention applied to a spherical plug valve. The spherical plug valve shown is similar to that more fully disclosed in Clade's United States Patent No. 2,861,883, dated November 25, 1958. Generally speaking, the valve consists of a generally tubular body portion 90 within which is rotatably mounted a spherical plug 92 held in position centrally of the body by end closures 94—94. The rotation of the ball is controlled by the stem 96 extending outwardly of the body. The inner end of the end closures has a frustural conical shape about the flow passage and located at such position is an insert 98. This insert is formed in accordance with the teaching of the present invention and has a load carrying structure 100 which is provided with means to orient and anchor the insert into position. To the sealing face of the insert there is bonded very thin layers 102—102 of fluorocarbon material and the ball is in contact with the resilient surface of the fluorocarbon material which acts as a seal therefor. FIGURES 14 and 15 are diagrammatic cross sections showing a Belleville spring type insert for a spherical ball valve. FIGURE 14 shows the valve in open position with the Belleville spring insert 104 holding the spherical ball 106 more or less centered in the body cavity. In FIGURE 15, the valve is shown in a closed position, and the spherical plug 106 has moved over against the downstream insert 104; however, due to the natural resiliency of the Belleville spring insert, the upstream insert 104 is also in contact with the spherical plug 106. In both forms of spherical plug valves illustrated, the spherical plug has been permitted to float and as previously mentioned in connection with the various types of plug valves, this is desirable inasmuch as it permits the plug to move over toward the downstream side of the valve and come into even more intimate contact with the resilient sealing member.

FIGURE 16 shows the application of the present invention to a gate valve. The valve shown is of the double wedge gate type similar to that shown in Laurent U.S. Reissue Patent 20,101. The valve has a body 110 having flow passages 112—112. Interposed between the flow passages is a gate chamber 114. Located in the gate chamber is a double wedge thru conduit gate 116. It is moved from fully open to a fully closed position by means of a stem 118 which passes through the top of the body. The gate is formed of two sections which expand in the fully open and fully closed position. The seat insert 120—120 is located in each flow passage. The seat insert is similar in construction to the seat inserts which have been previously described, that is, there is a load carrying structure 124 and to each side of the load carrying structure there is bonded a layer 126 of very thin fluorocarbon material. As the gate expands to a fully open or fully closed position, the gate members come into contact with the surface and form a seal on both the upstream and downstream side of the valve. If polytetrafluoroethylene is used as the material, the low coefficient of friction will serve it well when the gate is moved from either a fully open to a fully closed position inasmuch as there is normally some drag along the seat surface.

FIGURE 18 is a cross sectional view showing a very thin layer 128 of fluorocarbon material bonded to a member 130 which could be the gate of FIGURE 16 or the plug previously disclosed, or could be a seat member such as the seat shown in FIGURE 16 or the body shown in FIGURE 6. Also, a layer of the very thin fluorocarbon material can be bonded to the seat surface itself rather than having a separate liner or insert. In all cases, the very thin layer of fluorocarbon material by being bonded to a load carrying structure has a load carrying strength many times in excess of a similar piece of unbonded material.

The present sealing and load carrying means is of relatively simple and rugged construction and is adapted for various uses wherever sealing or ease of operation is desired in addition to those just described.

As can be appreciated from the foregoing, the invention resides in the bonding of a very thin layer of fluorocarbon material to a load carrying member and utilizing the assembly as a seal for a valve. As has been described, the assembly can be used in various ways, from bonding the material directly to the seat or valve member to forming a wrap-around liner or separate insert.

The bonding of the very thin layer of fluorocarbon material to a load carrying member gives it excellent load carrying capacity and cuts down on total expansion overcoming two major weak points of fluorocarbon for use as a high pressure valve seat thereby permitting the use of a material which has a high degree of inertness, a good temperature range, necessary resiliency to seal minor irregularities and a low coefficient of friction.

As various changes may be made in the form, construction and arrangements of the parts herein without departing from the spirit and scope of the invention without sacrificing any of its advantages, it is to be understood that all matter herein is to be interpreted as illustrative and not in a limting sense.

I claim:

A valve body provided with fluid passageways communicating with a central body cavity, a valve seat insert positioned in said body cavity to form a seat, said insert having portions extending into the passageways to orient and anchor said insert in position, said insert including a member of load carrying material, said load carrying material having one face to which a very thin layer of fluorocarbon material is bonded thereto, said fluorocarbon material being from the group consisting of polytetrafluoroethylene and polychlorotrifluoroethylene, the thickness of said material being from .005" to .050", means forming a seal between the insert and the central body cavity and a valve member cooperating with said very thin layer of fluorocarbon material to control the flow of fluid through said valve body.

References Cited in the file of this patent

UNITED STATES PATENTS

| | | |
|---|---|---|
| 2,516,425 | Sarver | July 25, 1950 |
| 2,612,340 | Laurent | Sept. 30, 1952 |
| 2,735,645 | Freed | Feb. 21, 1956 |
| 2,905,197 | Jones | Sept. 22, 1959 |
| 2,973,183 | Alger | Feb. 28, 1961 |

FOREIGN PATENTS

| | | |
|---|---|---|
| 1,171,525 | France | Oct. 6, 1958 |